United States Patent [19]

Provost

[11] Patent Number: 4,551,898

[45] Date of Patent: Nov. 12, 1985

[54] CRANKSHAFT SEAL INSTALLING TOOL

[75] Inventor: Lawrence A. Provost, Warren, Mich.

[73] Assignee: Kent-Moore Corporation, Warren, Mich.

[21] Appl. No.: 577,159

[22] Filed: Feb. 6, 1984

[51] Int. Cl.[4] .............................................. B23P 19/04

[52] U.S. Cl. ......................................... 29/235; 29/263

[58] Field of Search ................. 29/235, 256, 258, 263, 29/264, 265

[56] References Cited

U.S. PATENT DOCUMENTS 2,860,407 11/1958 Grunder et al. ...................... 29/258

2,872,728 2/1959 Fraser .................................. 29/256

2,958,124 11/1960 Hardy .................................. 29/235

3,762,021 10/1973 Racin .................................. 29/263

4,457,061 7/1984 Eason .................................. 29/264

*Primary Examiner*—Frederick R. Schmidt

*Assistant Examiner*—Steven P. Schad

*Attorney, Agent, or Firm*—Beaman & Beaman

[57] ABSTRACT

A tool for installing an oil seal for an internal combustion engine crankshaft wherein an adapter is affixed to the end of the crankshaft having a cylindrical guide surface upon which the seal is initially located axially positioning the seal in alignment with a recess in which it is to be received. A ram axially movable upon the adapter is translated by a wing nut to displace the seal from the adapter guide surface into the seal recess while maintaining the proper orientation of the seal throughout the entire installation procedure.

5 Claims, 3 Drawing Figures

CRANKSHAFT SEAL INSTALLING TOOL

BACKGROUND OF THE INVENTION

Oil seals are used to confine lubricating oils, and are commonly utilized between housings and rotating members extending therethrough. Such seals normally produce a sealing relationship between the outer diameter of the seal with a housing, and a sealing relationship with the rotating member at the seal inner diameter.

In internal combustion engines it is common to employ an oil seal at the rear of the engine block where the crankshaft extends through the block for attachment to the clutch or transmission. Such crankshaft oil seals are relatively large in diameter, but of limited radial and axial dimension having little structural strength, and must be closely confined to achieve their purpose.

Due to the heat, vibration and extended wear to which engine crankshaft seals are subjected, difficulty has been experienced in designing this type of seal which would produce efficient sealing over extended durations. By sophisticated seal design and tolerance control, acceptable seals have now been produced for this purpose, but difficulty has been encountered in properly installing the seals in such a manner as not to damage the seal and insure proper orientation wherein the seal is free of localized stresses and misalignment.

As oil seals of the aforementioned type have little structural strength in themselves, it is most important that the seal be very carefully installed to prevent bending, twisting or crushing, and it is important that the axial and radial forces generated by the seal be uniform and directed in that manner for which the seal is designed. Oil seals are often installed by an axial displacement of the seal into a recess surrounding the crankshaft and if the axial forces imposed upon the seal are not uniformly distributed throughout the seal body cocking and tilting will occur which will produce the aforementioned problems and render the seal ineffective, or of limited duration.

It is an object of the invention to provide a tool for installing oil seals, such as for sealing crankshafts, wherein the tool is easy to use, does not damage the oil seal, and insures proper oil seal installation.

A further object of the invention is to provide an oil seal installing tool for installing an annular seal within an annular recess whereby uniform axial forces are imposed upon the seal during installation.

Another object of the invention is to provide an oil seal installing tool for use with crankshafts having an end intersected by threaded holes wherein the tool is temporarily attached to the crankshaft end to align the tool with the crankshaft and seal receiving recess and alignment of the tool is firmly maintained during the installation procedure.

Yet another object of the invention is to provide an oil seal installing tool which is of economical construction and may be utilized by operators of conventional mechanical ability.

In the practice of the invention the tool is employed in the installation of an oil seal upon a crankshaft having a plurality of axially extending threaded holes intersecting the crankshaft end. The seal is to be received within an annular recess defined in the engine block adjacent the crankshaft.

An adapter having a cylindrical guide surface of a diameter equal to the crankshaft diameter engaged by the oil seal is attached to the end of the crankshaft by threaded fasteners received within the crankshaft holes. A ram having an annular head overlying the adapter guide surface, and axially movable thereon, is supported upon an axial threaded shaft mounted on the adapter, and coaxial thereto. A wing nut threaded upon the shaft engages the ram for forcing the ram toward the crankshaft whereby upon placing the oil seal upon the adapter guide surface and attaching the adapter to the crankshaft end, rotation of the nut displaces the ram to force the seal from the guide surface into its engine block recess.

As the ram includes a seal engaging abutment surface lying in a plane perpendicular to the crankshaft axis, a uniform axial force is applied to the oil seal throughout its annular configuration as it is pushed into its recess. Thus, proper orientation of the seal is insured without imposing undue stress upon the seal, and engaging stop surfaces defined upon the adapter and ram prevent the seal from being crushed within the engine block recess.

The adapter is readily attached to the crankshaft end by a finger-type rotation of threaded fasteners which extend through the ram, and a compression spring circumscribing the threaded shaft biases the ram in a direction away from the adapter to expose the cylindrical guide surface upon the wing nut being "backed off" to a seal receiving position.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
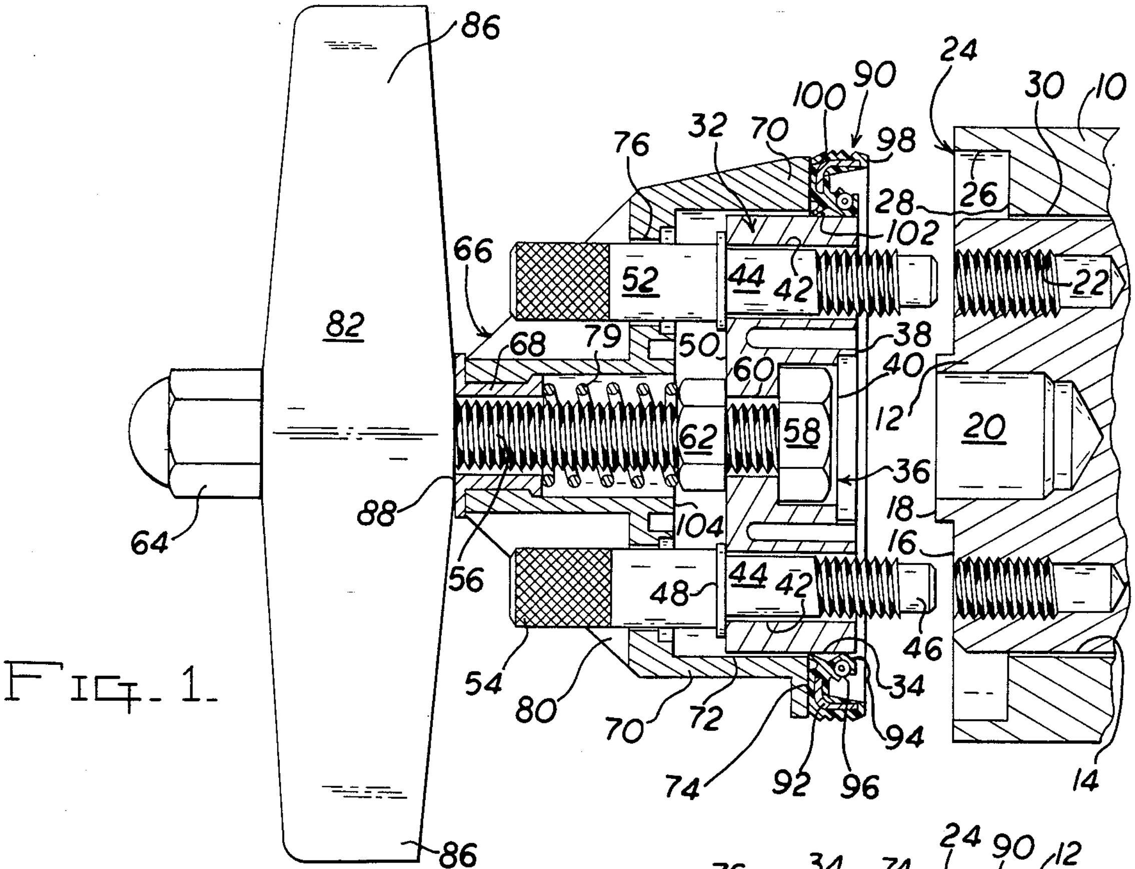
FIG. 1 is a diametrical, elevational, sectional view of a crankshaft seal installing tool in accord with the invention, a typical crankshaft installation also being illustrated, and the tool being aligned with the crankshaft prior to assembly thereto.
Figure 2:
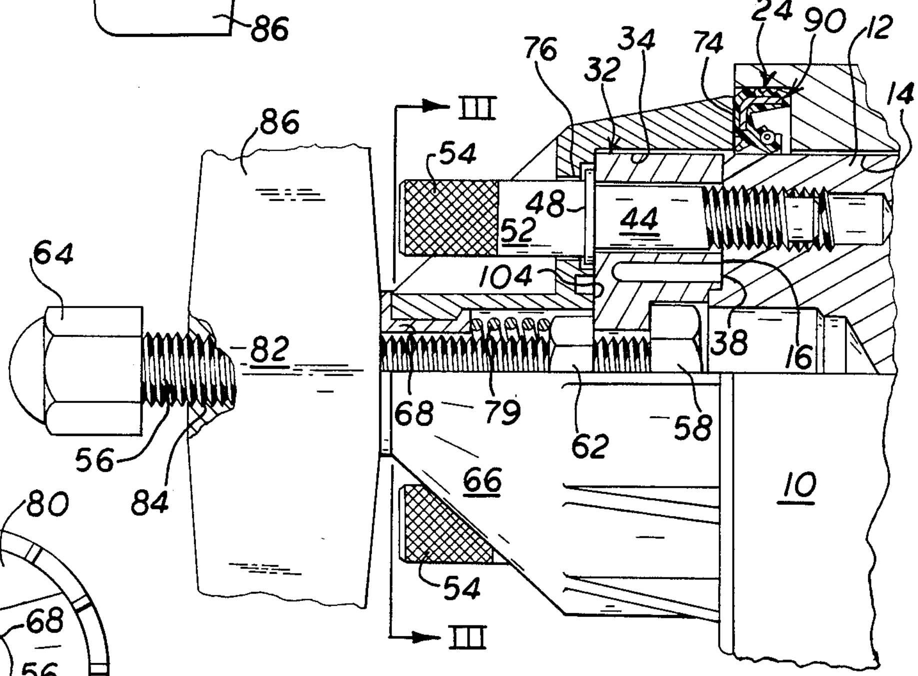
FIG. 2 is an elevational, partially diametrically sectioned, detail view of the seal installing tool and crankshaft assembly at the completion of seal installation.
Figure 3:
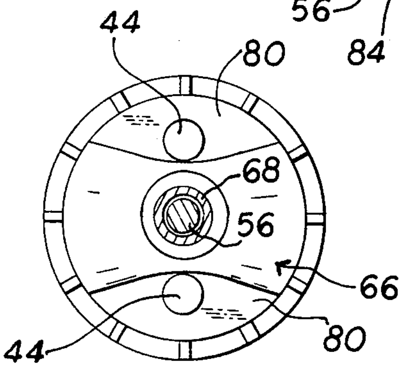
FIG. 3 is an elevational, sectional view as taken along Section III—III of FIG. 2.

With reference to the drawings, a typical engine block and crankshaft assembly is represented at the right of FIGS. 1 and 2 wherein the engine block rear portion appears at 10 and the crankshaft at 12. Of course, the crankshaft is supported within the engine block by the usual bearings, not shown, and the crankshaft includes a cylindrical surface 14, a radial end surface 16 having a boss 18, and a central bore 20. A plurality of axially extended threaded blind holes 22 are defined in the crankshaft intersecting end 16, and a pair of these holes are in opposed diametrical relationship relative to the crankshaft axis.

The engine block is provided with an annular recess 24 defined by cylindrical surface 26 and radial surface 28 intersecting the block bore 30 through which the crankshaft 12 extends. The tool includes an adapter 32 of a generally circular configuration having a central axis and a concentric cylindrical guide surface 34 defining its periphery. The adapter also includes a mounting end 36 upon which reference surface 38 is defined which lies in the plane perpendicularly disposed to the axis of the adapter, and engages the crankshaft end 16 during installation. The adapter mounting end also includes a recess 40 having a radial reference surface adapted to engage the crankshaft boss 18 during installation.

The adapter includes a pair of axially extending holes 42 intersecting the mounting end 36 and extending through the adapter, and a threaded fastener 44 is rotatably located within each hole 42. The threaded fasteners 44 include threads complementary in configuration to the threads within the crankshaft holes 22, and reduced diameter pilot portions 46 facilitate reception of the threaded fasteners within the crankshaft holes. The fasteners 44 also include a radially extending collar 48 of a diameter greater than the holes 42 for engagement with the adapter surface 50, and the fastener extensions 52 are of such length as to extend beyond the configuration of the ram, as later described, and at their outer end portion are knurled at 54 to facilitate finger rotation.

A threaded shaft 56 is mounted upon the adapter 32 and includes a head 58 received within an adapter recess and the shaft extends through the central adapter opening 60. Lock nut 62 engaging adapter surface 50 positions the shaft coaxially upon the adapter, and the outer end of the shaft is provided with a crowned nut 64 which serves as a wing nut stop.

An annular ram 66 is mounted upon the adapter 32 and shaft 56 for axial movement thereto. The ram includes a bushing 68 circumscribing the shaft 56 wherein the bushing functions as a sliding bearing, and the annular ram head 70 includes a cylindrical inner surface 72 slightly greater in diameter than the adapter guide surface 34 and radially extends over the adapter guide surface and includes the radial abutment surface 74. The adapter includes holes 76 through which the fastener extensions 52 extend, and recesses 78 accommodate the fastener collars 48 during the final stages of oil seal installation. A compression spring 79 surrounding shaft 56 engages nut 62 and bushing 68 and biases the ram to the left, FIG. 1.

The ram 66, as may the adapter 32, may be formed of a synthetic plastic material, and the configuration of the ram includes recesses 80 wherein the knurled extensions of the fasteners 44 will be readily accessible to the operator such that grasping of the fastener knurled portions permits the fasteners to be rotated.

A wing nut 82 is rotatably mounted upon the shaft 56 having a threaded bore 84 cooperating with the shaft threads, and the nut includes the wing handles 86 radially extending from the nut central portion permitting manual rotation of the nut. The central region of the nut includes radial surface 88 for engaging the ram bushing.

A typical oil seal 90 installed with the apparatus of the invention is illustrated in FIGS. 1 and 2, and this oil seal is defined by an elastomer wherein a metal angle reinforcement 92 is embedded therein, and the seal includes an inner rib 94 biased radially inwardly by the garter spring 96. Exteriorly, ridges are defined on the seal, and the seal includes an inner radial surface 98, and an outer radial surface 100 as well as lip 102.

To use, the wing nut 82 is rotated to position the nut to engage the stop nut 64. By so positioning the nut, the compression spring 79 biases the ram 66 to its leftmost position exposing the adapter guide surface 34 as will be apparent in FIG. 1. Thereupon, the operator places the oil seal 90 upon the exposed portion of guide surface to produce the assembly illustrated in FIG. 1.

After the oil seal has been placed upon the guide surface 34, the tool is coaxially positioned with the crankshaft 12 as shown in FIG. 1, and the fasteners 44 are aligned with the crankshaft holes 22. The threaded fasteners 44 are then inserted into the holes 22 by the aid of the pilots 46, and the fasteners are rotated by the fingers through knurled portions 54 to thread the fasteners into the crankshaft holes. The fasteners are tightened down firmly with the fingers, and such tightening engages the reference surface 38 with the crankshaft end surface 16 as the fasteners will engage the adapter edge 50 by means of the collars 48.

At this time, the adapter will be assembled to the crankshaft as illustrated in FIG. 2, and the oil seal 90 will be axially aligned with respect to the engine block recess 24, but will still be supported upon the adapter guide surface 34. At this time the nut 82 is rotated in a clockwise direction by means of the handles 86, and the nut will engage bushing 68 and axially displace the ram 66 upon the shaft 56 toward the right. Due to the engagement of the head abutment surface 74 with the seal surface 100, movement of the ram will axially displace the oil seal 90 from guide surface 34 into the recess 24, and rotation of the nut continues until the oil seal is fully installed as shown in FIG. 2.

During the translation of the oil seal upon the adapter guide surface, the continuous 360° engagement between the ram abutment surface 74 and the oil seal insures that the oil seal will be maintained in a plane perpendicular to the crankshaft axis during the seal installation procedure, and the seal will, when fully received within recess 24, engage the crankshaft surface 14, and the recess surfaces 26 and 28, as illustrated, producing an oil-tight relationship between the engine block and crankshaft.

The tool is removed from the crankshaft by the finger rotation of the fasteners 44. As the fasteners are unscrewed, the adapter will be released from the crankshaft and removed. If desired, the nut 82 may be unthreaded back against the stop nut 64 prior to unloosening the fasteners 44, and in such event the ram 66 will "retract" on the adapter prior to release of the adapter from the crankshaft.

From the above description, it will be appreciated that the oil seal installing tool of the invention permits a complex configuration oil seal to be quickly and accurately assembled within its recess without damage to the seal. Engagement of the ram surface 104 with the adapter surface 50 when the seal is properly positioned prevents the ram from pushing the seal too far into recess 24, and as the guide surface 34 is in alignment with the crankshaft surface 14 the transfer of the seal 90 from surface 34 to surface 14 occurs without folding the seal lips, or otherwise disturbing the desired relationship of the seal components to the crankshaft surface 14.

It is appreciated that various modifications to the inventive concepts may be apparent to those skilled in the art without departing from the spirit and scope of the invention.

I claim:

1. A crankshaft seal assembly tool for use with a crankshaft having an axis, a cylindrical end portion and a radial end surface intersected by a pair of axially extending threaded holes located on opposite sides of the crankshaft axis comprising, in combination, an adapter having an axis, a crankshaft mounting end transversely disposed to said axis and a concentric cylindrical guide surface intersecting said mounting end of a diameter substantially equal to the diameter of the crankshaft cylindrical end portion, a pair of axially extending threaded fasteners mounted upon said adapter located on opposite sides of said adapter axis adapted to extend beyond said mounting end and be received within the crankshaft holes when the adapter mounting end engages the crankshaft end surface to attach said adapter to the crankshaft end surface and maintain said adapter guide surface concentric and aligned with the crankshaft end portion, a ram mounted upon said adapter for relative axial movement thereto having an annular seal abutment head radially extending beyond and in radial alignment with said adapter guide surface having an abutment surface substantially perpendicular to said adapter axis, a pair of axially extending openings defined in said ram slidably receiving said threaded fasteners, said fasteners being of such length as to extend through said ram for direct access thereto, a threaded shaft coaxially mounted upon said adapter, and a nut threaded upon said shaft engagable with said ram for axially moving said ram on said threaded shaft from a seal loading position wherein said abutment head is axially retracted away from said adapter mounting end to expose said adapter guide surface permitting an annular seal to be mounted thereon to a seal installed position wherein said head is axially translated across said guide surface to displace the seal therefrom onto the crankshaft cylindrical end portion.

2. In a crankshaft seal assembly tool as in claim 1, said nut comprising a wing nut having radially extending handles, said threaded shaft having a free outer end, and a stop member affixed to said shaft outer end limiting outward movement of said nut upon said shaft.

3. In a crankshaft seal assembly tool as in claim 1, a spring interposed between said adapter and said ram biasing said ram in the axial direction away from said adapter mounting end.

4. In a crankshaft seal assembly tool as in claim 1, a compression spring circumscribing said threaded shaft and interposed between said adapter and ram biasing said ram in the axial direction away from said adapter mounting end.

5. In a crankshaft seal assembly tool as in claim 1, wherein said ram is formed of a synthetic plastic material.

* * * * *